United States Patent
Giust et al.

(10) Patent No.: US 10,887,198 B2
(45) Date of Patent: Jan. 5, 2021

(54) SYSTEM AND METHOD TO SUPPORT NETWORK SLICING IN AN MEC SYSTEM PROVIDING AUTOMATIC CONFLICT RESOLUTION ARISING FROM MULTIPLE TENANCY IN THE MEC ENVIRONMENT

(71) Applicant: NEC Laboratories Europe GmbH, Heidelberg (DE)

(72) Inventors: Fabio Giust, Heidelberg (DE); Vincenzo Sciancalepore, Heidelberg (DE); Lanfranco Zanzi, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 206 days.

(21) Appl. No.: 15/911,216

(22) Filed: Mar. 5, 2018

(65) Prior Publication Data

US 2019/0104030 A1   Apr. 4, 2019

Related U.S. Application Data

(60) Provisional application No. 62/565,152, filed on Sep. 29, 2017.

(51) Int. Cl.
    *G06F 15/16*   (2006.01)
    *H04L 12/24*   (2006.01)
    (Continued)

(52) U.S. Cl.
    CPC ........ *H04L 41/5022* (2013.01); *G06F 9/5072* (2013.01); *H04L 41/0681* (2013.01);
    (Continued)

(58) Field of Classification Search
    CPC .................................................. H04L 41/5022
    See application file for complete search history.

(56) References Cited

U.S. PATENT DOCUMENTS

2011/0321031 A1* 12/2011 Dournov .................. G06F 8/65
                                                    717/171
2012/0089682 A1*  4/2012 Wu ..................... H04W 28/24
                                                    709/206
(Continued)

FOREIGN PATENT DOCUMENTS

WO    WO 2016201340 A1   12/2016

OTHER PUBLICATIONS

ETSI GS MEC 003 V1.1.1 (Mar. 2016), "Mobile Edge Computing (MEC); Framework and Reference Architecture", Mar. 2016, pp. 1-18.

*Primary Examiner* — Kevin T Bates
*Assistant Examiner* — Clarence D McCray
(74) *Attorney, Agent, or Firm* — Leydig, Voit & Mayer, Ltd.

(57) ABSTRACT

A method for operating, by an MEC operator, a multi-access edge computing (MEC) system in which applications are provided by MEC tenants for deployment on MEC hosts of the MEC system and in which various levels of privileges are provided by the MEC operator to the MEC tenants. The method includes assigning, by an MEC broker, privileges to the MEC tenants; initiating, by the MEC broker via interactions with one or more of an MEC Orchestrator, an MEC platform manager, and a user app LCM proxy, operations. The operations can include one or more of application package on-boarding, application instance installation on selected MEC hosts, application provisioning, through configuration of appropriate parameters, and application life-cycle management operations including one or more of bootstrapping, termination, migration, scaling. The method further includes pre-validating, using the privileges provided to the MEC tenants, operation requests issued by the MEC tenants.

20 Claims, 7 Drawing Sheets

(51) Int. Cl.
 *H04L 29/08* (2006.01)
 *G06F 9/50* (2006.01)

(52) U.S. Cl.
 CPC ...... *H04L 41/0816* (2013.01); *H04L 41/0893* (2013.01); *H04L 41/5054* (2013.01); *H04L 67/2804* (2013.01); *H04L 67/2809* (2013.01)

(56) References Cited

U.S. PATENT DOCUMENTS

2012/0110055 A1\* 5/2012 Van Biljon ............ G06Q 30/04
 709/201
2017/0251368 A1\* 8/2017 Ross ................... H04L 41/0803
2019/0037401 A1\* 1/2019 Egner ................. H04L 63/0853

\* cited by examiner

SYSTEM AND METHOD TO SUPPORT NETWORK SLICING IN AN MEC SYSTEM PROVIDING AUTOMATIC CONFLICT RESOLUTION ARISING FROM MULTIPLE TENANCY IN THE MEC ENVIRONMENT

CROSS-REFERENCE TO PRIOR APPLICATION

Priority is claimed to U.S. Provisional Patent Application No. 62/565,152, filed on Sep. 29, 2017, the entire disclosure of which is hereby incorporated by reference herein.

FIELD

The present invention relates to multi-access edge computing (MEC) systems, and specifically to methods and systems for allowing multiple tenants to operate a shared MEC system, i.e. an MEC slice.

BACKGROUND

Convergence of Information Technology (IT) and networking is realized in MEC. MEC is a promising technology to bring cloud computing capabilities at the edge of a network, where low latency and high bandwidth can be exploited by cloud applications in order to deliver added-value services to its end users. MEC targets use cases, such as tactile Internet, augmented and virtual reality, live streaming, etc. and specific vertical industry segments, as industrial automation, electronic health (eHealth), automotive, etc.

The European Telecommunications Standards Institute (ETSI) has chartered the MEC Industry Specifications Group precisely to define a multi-vendor standardized MEC system to allow third party software providers to install their applications in the network operator's premises. The ETSI specifications include, among others, an MEC framework and reference architecture, management interfaces definitions, application enablement API (application programming interface), radio network information API, and location API.

According to the ETSI MEC architecture, an MEC provider (e.g., a mobile network operator) owns the MEC system which comprises a set of MEC hosts and MEC management entities. Third party software providers (i.e., MEC tenants) deliver their application package(s) to the MEC provider, which is responsible for deploying the application instance(s) in the MEC hosts, configuring the appropriate parameters and traffic rules, and enforcing the policies in fulfilment of agreed-upon service level agreements (SLAs).

Although the service model described above matches the infrastructure as a service (IaaS)/platform as a service (PaaS) models offered by many cloud computing providers, network operators are exploring techniques to monetize their infrastructure by offering network slices to tenants. In the context of MEC, one way to offer an MEC slice is enabling the MEC tenant to operate and manage the MEC system according to different privilege levels in order for the tenant to gain more control over the delivered service. An example of such multi-tenancy can be illustrated as a Mobile Virtual Network Operator (MVNO) which desires to expand its business model by renting part of the MEC facilities. It is expected that an MVNO possesses the necessary expertise in order to operate the MEC system, therefore, the MVNO requests access to the management system in order to tailor the system according to its own needs.

Figure 1:
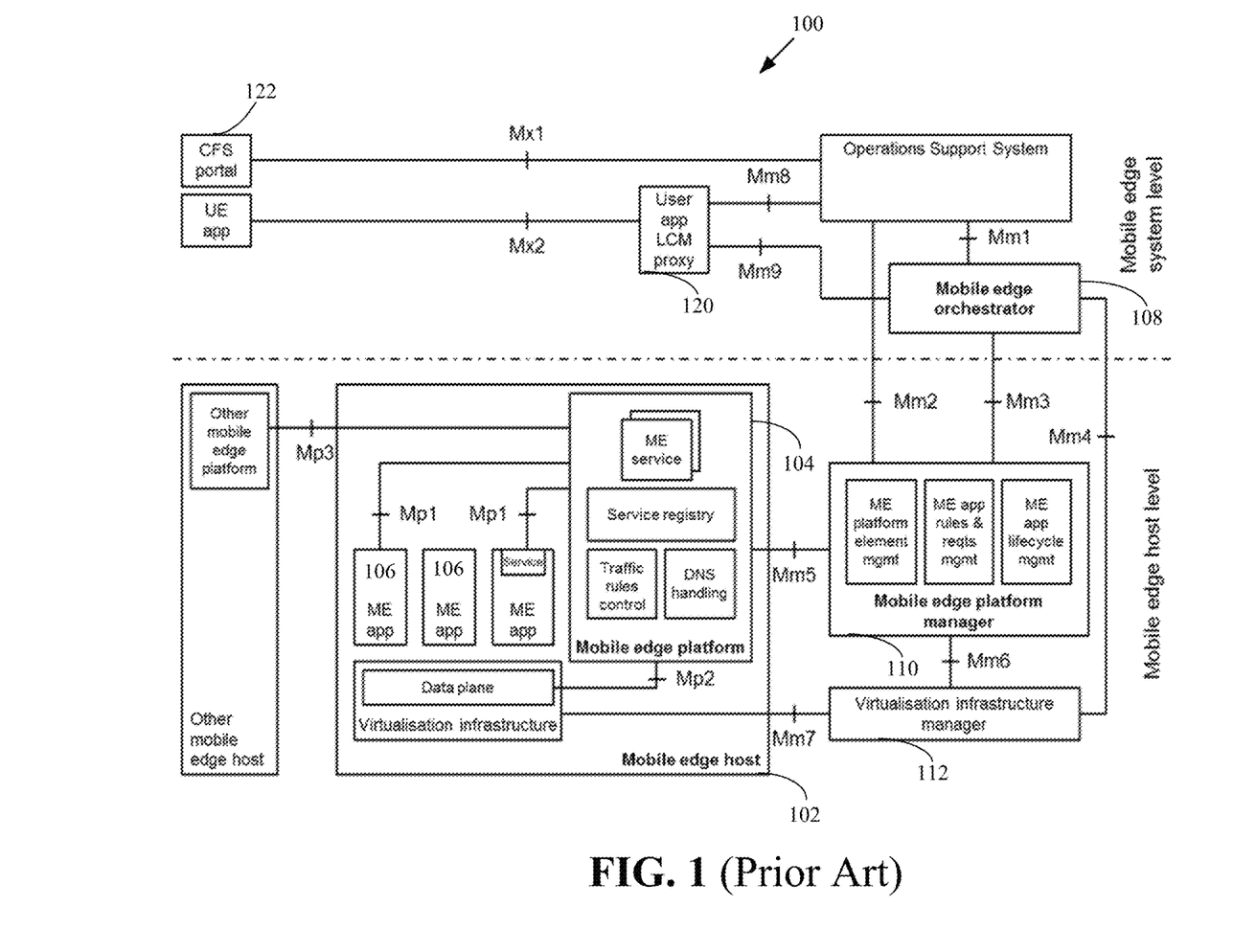
FIG. 1 illustrates an MEC reference architecture in the prior art.

FIG. 1 illustrates a reference MEC system 100, in the prior art, which allows third party application providers to install and run their application software in the service operator's premises. More specifically, the application software is installed at the edge of the network with a direct routing path connected to the users that dramatically abates the communication latency. The MEC system administrator, herein called the MEC provider, owns the MEC hosts, i.e., the IT facilities where the MEC platforms reside and where MEC applications run, and manages MEC hosts 102, platforms 104 and applications 106 through an MEC management system, which comprises three components: an MEC orchestrator 108, an MEC platform manager 110 and a virtualized infrastructure manager 112.

In the service model of the MEC system 100, over-the-top (OTT) service and third party service providers, i.e., MEC tenants, interact with an MEC provider through the Customer Facing Service (CFS) portal, which connects MEC tenants to the MEC provider's Operation Support System (OSS). MEC tenants deliver their application package(s) containing a virtual machine image (i.e., the application software) and additional files (e.g., application descriptors, specific KPIs of such application, metadata, manifest, etc.) to the MEC provider. Then, the application on-boarding, instantiation and lifecycle management (LCM) is executed by the MEC provider through its OSS which is connected to the MEC Orchestrator 108 and to the MEC platform manager 110. Thus the role of the MEC tenant is limited to controlling the application's logic (e.g., through remote access to the application's backports), whereas the MEC provider is responsible for management decisions as follows (not exhaustive list): the place where the application should run (i.e., set of available MEC hosts where the application is installed and executed); application lifecycle management (LCM) operations like bootstrapping, termination, scaling, in/out and up/down, migration in case the host is running out of resources; the application-assigned networking, computing and storage resources; the policies for application migration to other MEC hosts; and domain name system (DNS) and traffic rules configuration in order to provide the appropriate connectivity, in fulfilment of the agreed SLAs and of the MEC service provider's policies and capabilities.

Service providers are exploring novel technological directions to monetize their infrastructure by offering network slices to tenants. In the context of MEC, one way to offer an MEC slice is exposing more comprehensively the MEC management toolset by the MEC providers to MEC tenants. In addition, a significant gain is recognized when MEC tenants has very heterogeneous requirements which may be efficiently combined together driving the system towards an overall system revenue maximization.

An example of such multi-tenancy can be illustrated as a Mobile Virtual Network Operator (MVNO) which desires to expand its business model by renting also part of the MEC system. It is expected that an MVNO holds the necessary expertise (i.e., the appropriate OSS functions) to operate an MEC system as well (e.g., to control the MEC orchestrator 108), so that the MVNO requests access to the MEC management system in order to customize its MEC environment. This might be achieved if the MEC provider may allow MEC tenants to operate on the MEC system according to different usage levels (i.e., to execute all or part of the operations listed above), i.e., it is possible to grant access to different MEC management entities, such as the MEC orchestrator. The novelty relies on an innovative and advanced mechanism, which is able to allow co-existence of heterogeneous MEC slices within the same shared MEC facilities.

SUMMARY

In an embodiment, the present invention provides a method for operating, by an MEC operator, a multi-access edge computing (MEC) system in which applications are provided by MEC tenants for deployment on MEC hosts of the MEC system and in which various levels of privileges are provided by the MEC operator to the MEC tenants. The method includes assigning, by an MEC broker, privileges to the MEC tenants; initiating, by the MEC broker via interactions with one or more of an MEC Orchestrator, an MEC platform manager, and a user app LCM proxy, operations. The operations can include one or more of application package on-boarding, application instance installation on selected MEC hosts, application provisioning, through configuration of appropriate parameters, and application lifecycle management operations including one or more of bootstrapping, termination, migration, scaling. The method further includes pre-validating, using the privileges provided to the MEC tenants, operation requests issued by the MEC tenants by the MEC broker to detect conflicts on the MEC hosts.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

LIST OF ABBREVIATIONS

| | |
|---|---|
| LCM | Lifecycle Management |
| MEC | Multi-Access Edge Computing |
| OSS | Operations Support System |
| IaaS | Infrastructure as a Service |
| MVNO | Mobile Virtual Network Operator |
| OTT | Over-the-top |

DETAILED DESCRIPTION

The MEC slicing described above does not allow tenants to operate the MEC system while performing application LCM on their own. In order for a tenant to be able to perform application LCM, the tenant should be granted access to the management entities that are visible from the MEC provider's OSS, i.e., the MEC orchestrator 108, the MEC platform manager 110 and the User app LCM proxy 120. The MEC slicing discussed above enables an MEC provider to benefit from its infrastructure by selling privileges to tenants. However, when different tenants operate on the same MEC infrastructure, e.g., through the MEC orchestrator 108, advanced collision avoidance mechanisms must be put place in order to validate policies and instructions coming from multiple tenants and enforce these policies and instructions while avoiding conflict states.

Embodiments of the present invention provide an optimization framework for MEC slicing, considering both end-to-end application delay requirements and platform computation/storage capabilities. An MEC system may be running multiple applications from multiple MEC tenants with different SLA requirements. As applications from the multiple tenants utilize and/or demand more and more resources, the MEC system may need to adapt in order to satisfy different SLA requirements of the multiple tenant. Embodiments of the present invention improve MEC system performance by increasing resource utilization efficiency, improving resource allocation and load balancing within the MEC system, and reducing end-to-end application delay.

Embodiments of the present invention provide for execution of orchestration algorithms responsible for resource allocation in an MEC system according to the requests issued by the tenants and the corresponding SLA. Such an orchestration algorithm is, according to embodiments of the invention, executed by an MEC broker, an entity capable of interacting with MEC tenants in order to assign privileges and resolve conflicts that may arise when multiple tenants contend for limited resources in a shared infrastructure. Systems and methods of embodiments of the invention that provide for execution of such orchestration algorithms improve MEC system performance by enabling superior resource allocation so as to, e.g., improve conflict resolution amongst multiple tenants. Improved conflict resolution ensures that the MEC system is not bogged down by heterogeneous tenant commands.

Embodiments of the present invention define a system which allows multiple entities to operate an MEC system as well as mechanisms running on an MEC orchestrator that enable appropriate usage levels to be assigned to different MEC tenants and to resolve conflicts that may arise in the context of a multi-tenant MEC infrastructure. In such MEC systems, multiple MEC tenants often have different SLA requirements. Assigning appropriate usage levels to MEC tenants allows for commands from some MEC tenants to be prioritized over commands from other MEC tenants. The assignment of such usage levels assists the MEC system to systematically resolve conflicts using the associated priorities.

Embodiments of the present invention allow MEC tenants to not only hand their application to the MEC administrator, but also to administer and manage how such applications are deployed, configured and executed. For example, infrastructure and service providers that own MEC platforms can make their platforms available to MEC tenants willing to pay for running MEC applications on the MEC platforms. Depending on the usage level associated with an MEC tenant, embodiments of the present invention allow the MEC applications to be managed by an MEC administrator (low-level privilege) or by an MEC tenant (high-level privilege). As such, embodiments of the present invention allow administration of MEC applications by multiple sources, making system administration more flexible. This flexibility can reduce downtime of MEC applications since when an error occurs in an application, depending on the associated privilege, an MEC tenant can quickly resolve the error instead of alerting an MEC administrator and waiting for the error to be resolved. An MEC tenant may have a better grasp of their associated MEC applications as compared to an MEC administrator that may have to manage a variety of MEC applications from heterogeneous MEC tenants.

According to an embodiment of the invention, an MEC system is provided that supports different MEC slices with heterogeneous privileges and corresponding priorities running on shared MEC hosts by means of a conflict resolution of competing tenants' requests. MEC tenants, ones with high-level privilege or associated with having a higher level priority, that have access to a fully-controlled MEC slice can perform administrative functions on the MEC slice, thus enabling administrative privileges for MEC tenants to manage their respective MEC applications. The priority designation provides a mechanism for prioritizing one tenant's needs over another in order to resolve a conflict or avoid a potential conflict.

According to embodiments of the invention, an MEC broker is provided that provides, in a seamless manner, MEC system capabilities to MEC tenants, which may: (i) use the IT capabilities of an MEC host to run their own applications, (ii) have direct access to a virtualized set of MEC hosts and to an IT management console to install their own applications, and (iii) be aware of the location of MEC hosts and have direct access to the physical MEC hosts as well as to an IT management console connected to such hosts.

Figure 2:
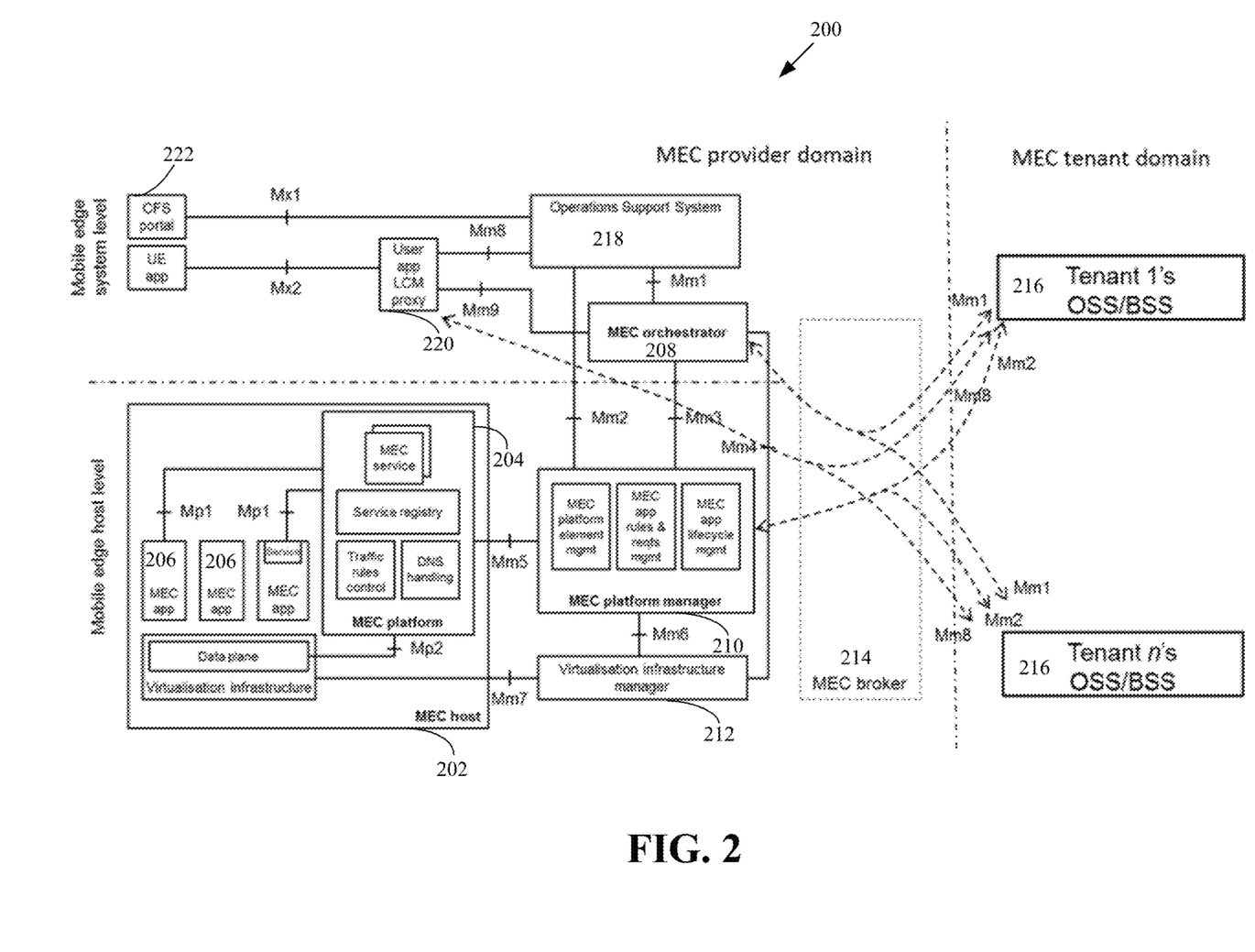
FIG. 2 illustrates an MEC broker and its role in the MEC reference architecture, according to an embodiment of the invention.

In order to enable an MEC tenant's OSS to directly operate the MEC system, embodiments of the present invention expose to the tenant's OSS the required MEC interfaces and MEC functions, i.e., those available over the Mm1, Mm2, and Mm8 reference points in the ETSI MEC architecture of FIG. 1. The reference points are connections between different entities in the system. For example, the Mm1 reference point is a connection between the operations support system and the mobile edge orchestrator 108. FIG. 2 illustrates an MEC broker 214 and its role in an MEC architecture 200, according to an embodiment of the present invention. To enable exposure of MEC interfaces and functions, the MEC management system is augmented with a set of functionalities that, from an architectural point of view, can be grouped into the MEC Broker 214, which logically connects to the OSS 218 from multiple tenants 216.

The MEC architecture 200 includes one or more components, e.g., the MEC broker 214, the MEC host 202, and the MEC management system, which are implemented on one or more servers. The servers include at least one processor, memory, hard disk, and networking interface. The networking interface enables communication with the MEC tenants and one or more users of the MEC tenants. The networking interface also allows communication with one or more mobile networks through a radio access network. The one or more processors of the one or more servers is each configured to execute instructions stored in the memory or hard disk to perform functions described for each of the MEC broker 214, the MEC host 202, and the MEC management system.

The MEC broker 214 ensures the consistency of the policies, configuration elements and commands received by the different tenants 216, by validating the instructions and by resolving conflicts when necessary. The MEC broker 214 assigns tenants with privileges and priorities. Privileges refer to the set of allowed actions that a tenant 216 is authorized to perform. The privileges map directly to the usage of the MEC interfaces that are exposed over the Mm1, Mm2, and Mm8 reference points. Priorities refer to the time validity of a privilege, and how commands issued by different tenants 216 are processed when producing unstable and/or conflicting states in the MEC system 200.

The MEC broker 214 performs the following functions:
(1) Exposes, to the tenant's OSS 216, the interfaces that are transported over the MEC reference points (Mm1, Mm2 and Mm8) connected to the OSS 218. The MEC broker 214 exposes to the tenant's OSS 216 the interfaces that are transported over the MEC reference points (Mm1, Mm2 and Mm8) connected to the OSS 218. The reference points Mm1 and Mm2 are specified by ETSI MEC in GS MEC010 (Part 1 and Part 2). Mm8 is not specified by ETSI and is vendor-specific. The MEC broker 214 seamlessly provides all MEC functionalities to heterogeneous tenant demands.

(2) Distributes, revokes, modifies and checks privileges and priorities, including the interfaces towards the tenant 216 to enable such operations. The MEC broker 214 distributes, revokes, modifies and checks privileges and priorities, including the interfaces towards the tenant 216 to enable such operations. The MEC broker enables a login-based procedure through which a tenant acquires privileges and priorities, asks for updates and queries the status. The login-based procedure may include entering a username/password combination and/or using a public/private key pair or a certificate. The operations available for the tenant to execute over the Mm1, Mm2, and Mm8 reference points are determined by the privileges, e.g. LCM privileges, granted by the MEC system provider to the tenant 216. The operations that such privileges may enable include the interfaces specified in [GS MEC 010] (Part 1 and Part 2) as well as those vendor-specific. Each privilege is tagged with the priority acquired by the tenant 216. The tag has a validity in time and indicates the priority of the operation over those requested by the other tenants. A list of available privileges is provided by the MEC broker 214, which is also responsible for updating the available list of privileges and forwarding it to MEC tenants 216. The MEC broker records all the privileges acquired by the tenants into an appropriate database (local to the MEC broker 214 or external to it and accessed with appropriate functions) with the associated tags. Similarly, the MEC broker 214 records in said database all the subsequent operations over said privileges, either performed by the tenant 216 or by the MEC broker 214 itself, including modification (e.g., changing privilege priority), revocation (e.g., before expiry), renewal and deletion (e.g., upon expiry). This way the MEC broker 214 keeps track of which privileges are acquired by each tenant 216 at any time, and they can be looked up by the MEC broker 214 to perform checks.

(3) Records the commands and instructions issued by tenant 216 over the exposed MEC reference points (Mm1, Mm2, and Mm8) in order to validate and execute the commands and instructions. When a particular privilege (i.e., MEC operation) is held by the tenant 216, the priority associated to the privilege is looked up by the MEC broker 214 in a database storing the privileges assigned to tenants. Based on results of the lookup, the MEC broker 214 determines if the operation can be executed (i.e., if the privilege is actually granted to the tenant 216) and evaluates conflicts associated with the operation, e.g., installing a DNS record with an already used IP (internet protocol) address or domain name. A conflict may occur when shared resources are concurrently used, e.g., in a race condition when an instruction overrides another leading to an undesired state. A conflict may also occur if the MEC system is running out of resources. If a conflict is detected either upon the lookup phase or when available MEC resources (e.g., computing resource at MEC hosts, IP addresses in a given range, DNS records in a pool) decrease below a guard threshold, the MEC broker 214 generates an alarm signalled to all the lower priority tenants, which are automatically disabled from executing such operations. The MEC broker 214 will efficiently try to reduce the number of conflicts by promptly balancing the MEC tenants' applications 206 over available MEC hosts 202.

The MEC broker 214 can be implemented in different ways. In an embodiment of the present invention, the MEC broker 214 is implemented as an additional entity as shown in FIG. 2, with appropriate reference points (Mm1, Mm2, Mm8) to bear the interfaces between the MEC broker 214 with the other components of the MEC management system (namely the MEC orchestrator 208, the MEC platform manager 210 and the user app LCM proxy 220).

In another embodiment, the MEC broker 214 is realized by extending capabilities of each of the MEC management system components, namely the MEC orchestrator 208, the MEC platform manager 210 and the user app LCM proxy 220, in order to provide functionality described above with respect to items (2) and (3). In another embodiment, the MEC broker 214 is realized by extending the MEC provider's OSS 218 or the CFS portal 222.

From an operational point of view, the MEC broker 214 manages incoming resource requests from tenants and maps the requests to the resources available from the set of deployed MEC hosts. This task can be traced back to a Bin Packing problem, and requires a holistic view of the network to be addressed. Operators may require the deployment of application in specific geographical locations, e.g., for administrative or political reasons. However, the MEC system 200 is a shared platform and providing this kind of management privileges to external tenants may lead to operational problems (e.g., DNS conflicts storing DNS records pointing to multiple addresses) as well as wasted resources.

The architectural enhancements of embodiments of the present invention enable tenants to access an MEC system with additional control over MEC resources as compared to the prior art. According to an embodiment, for example, the MEC broker 214 is connected to each tenant 216, exposing appropriate reference points (Mm1, Mm2, Mm8) to the tenants 216 based on privileges associated with the tenants 216. The MEC broker 214 is connected to the other components of the MEC management system that use the appropriate reference points. That is, the MEC broker 214 interfaces with the MEC platform manager 210 for access to the reference point Mm2, the MEC orchestrator 208 for access to Mm1, and the user app LCM proxy 220 for access to Mm8. Commands from tenants 216 through at least one of the reference points can be pre-validated by the MEC broker 214 before being routed to an MEC management system component. The MEC broker 214 thereby enables the tenants 216 to perform operations over the Mm1, Mm2, and Mm8 reference points by receiving commands from the tenants, validating them, and routing them to a corresponding MEC management system component, e.g. the MEC platform manager 210, the MEC orchestrator 208, and the user app LCM proxy 220.

According to an embodiment, an MEC system includes a set of MEC hosts $H_i$, where $i \in \mathcal{I} := \{1, \ldots, I\}$, which are available to run the set of applications $A_k$, where $k \in \mathcal{K} := \{1, \ldots, K\}$, and services $S_w$ where $w \in \mathcal{W} := \{1, \ldots, W\}$, coming from different tenants. According to an embodiment, each tenant asks for the deployment of only one application and its related services.

The case of multiple requests coming from the same tenant can be straightforwardly mapped into the presented scenario. A service is defined as a process which runs in the background and does not directly interact with the user, although it can expose an interface to other applications and support them during run-time. Some services are built-in within the MEC host, while others may be installed on-demand. Each MEC host $H_i$ is characterized by $H_i = \{c_i, \lambda_i, \delta_i\}$ where $c_i$ is the host's total available capacity, expressed as a single value which synthetizes the host's computing resources, $\lambda_i$ is a fixed term that takes into account average latency to the users due to MEC and radio access network (RAN) displacement, and $\delta_i := \{\delta_{i,j}\}$ $j \in \mathcal{I}$ where $\delta_{i,j}$ is the average transport latency between two hosts $H_i$ and $H_j$. An admission control procedure (not described), in place in the MEC system, translates the incoming tenant requests for each application $A_k$ (and relative throughput and delay requirements), into the following parameters, e.g., from the application package descriptor: $a_k$ processing consumption; $\Delta_k$ highest tolerable end-to-end delay; and $b_{k,w}$ the set of services $\{S_w\}$ required by the application $A_k$ to run in the same host as the application itself.

Each application $A_k$ can be described as $A_k = \{a_k, \Delta_k, b_{k,w}\}$, where $a_k$ represents the processing consumption, $\Delta_k$ is the highest tolerable latency, $b_{k,w}$ is the set of services $\{S_w\}$ required by the application $A_k$ to run in the same host as the application itself. Each tenant asks for the deployment of its application $A_k$ in one or more hosts, thus requests are modelled as a set of binary variables $z_{k,i} \in \{0,1\}$ where $z_{k,i} = 1$ if $A_k$ is requested on host $H_i$, and 0 otherwise. In an embodiment, the set of binary variables for each MEC tenant is assigned to one of three different categories according to heterogeneous application requirements and required privileges. The categories can be, e.g. Basic, Premium, and Gold. In Basic, tenants request to run one or more instances of the same application on different hosts, with loose delay requirements and without management privileges. In Premium, tenants request to run one or more instances of the same application on different hosts with stringent delay requirements and without management privileges. In Gold, tenants request direct access to an MEC slice, that is, a dedicated set of resources, i.e., capacity, in one or multiple MEC hosts, along with certain management privileges and latency guarantees.

The first category represents the legacy MEC scenario in which tenants ask for the deployment of a given service over MEC platforms, without asking for any guarantee but the delivery of the service itself.

According to network slicing, an infrastructure provider can decide to lease a portion of its facilities to external tenants, providing them at the same time the capability to manage the allocated resources, e.g., through ad-hoc interfaces. Granting this kind of privileges in shared systems where users do not have a holistic view of the environment may lead to conflicts and impact overall performances. The MEC system relies on wired networks as backhaul connection for management purposes, e.g., for application provisioning. For this reason, the MEC system can be depicted as an undirected graph $\mathcal{G}(\mathcal{J}, \varepsilon)$, where $\mathcal{J}$ is the set of nodes (MEC hosts), and $\varepsilon$ is the set of equivalent links between nodes. In an embodiment, consider each of these links as the sum of all the physical links along the path between two different hosts, and characterize them in terms of cumulative delay. Each link has enough capacity to satisfy traffic requirements, i.e., possible congestion delays are not considered. Using the above convention, the placement of applications in the system may be optimally defined for delivering MEC services in a multi-tenant scenario.

This procedure becomes more challenging as the number of hosts and requirement inflexibility increase. In an embodiment, multiple instances of the same application can run over different MEC hosts in the network. However, given that MEC hosts have limited capacity, and this may be not uniformly distributed across the network (that is, MEC hosts have different $c_i$ capacity values), it could be useful from the MEC provider's point of view to migrate some applications. For example, an overloaded MEC host can be offloaded, migrating some instances of running applications to another MEC host for the purposes of load balancing and increasing overall reliability. The MEC system could further benefit from migration, considering that different applications may require the same services. Consolidation of applications spread across multiple MEC hosts allows for overall processing capacity reduction and consequently results in operational cost savings. Moreover, the saved capacity could be engaged to admit other requests and increase the acceptance rate of the network while, from an economical point of view, increase revenues. Slice request arrivals/departures occur every time a tenant choses to deploy a new service to its users or modify its choice in terms of location and/or privileges. Upon receiving the slice request set, the provider solves a placement problem, pursuing an objective of minimizing overall capacity utilized for the slice request set while honoring the agreed guarantees, i.e., SLAs.

Figure 3:
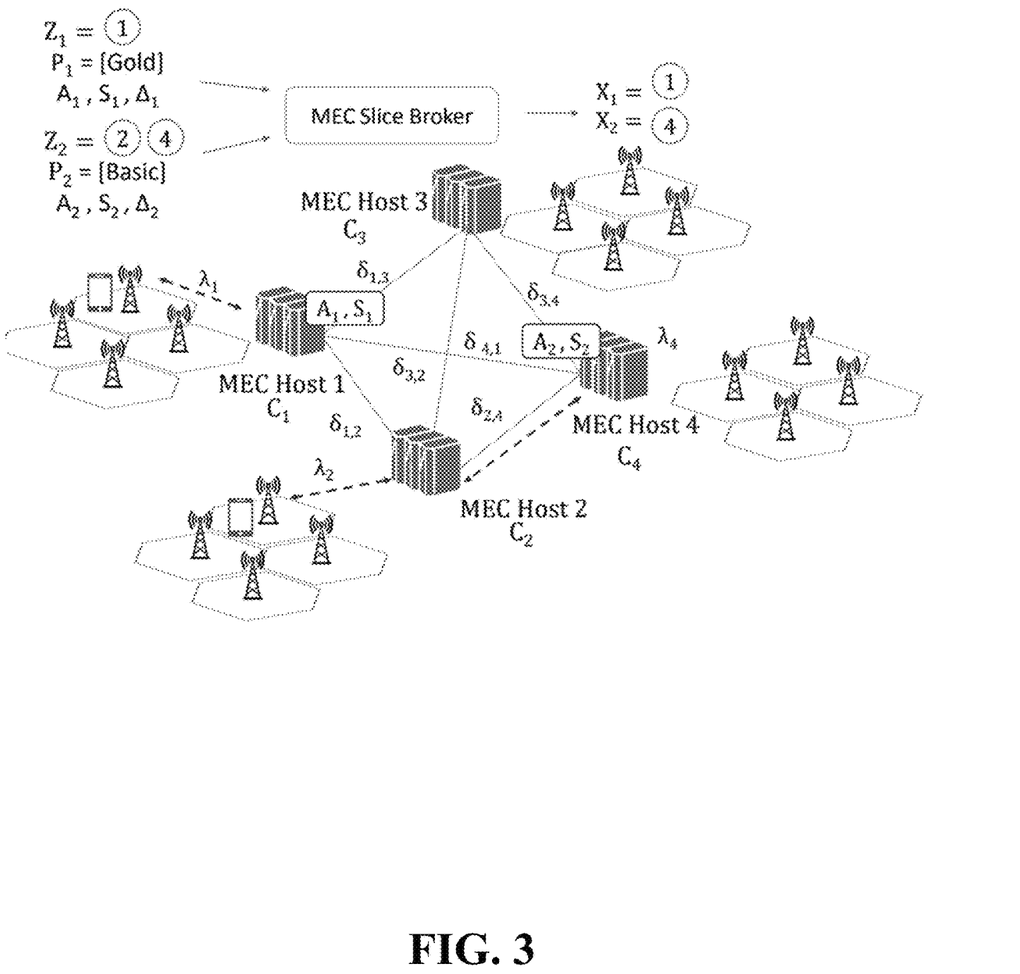
FIG. 3 depicts an MEC topology model according to an embodiment of the invention.

FIG. 3 depicts an MEC topology model according to an embodiment of the invention. The example in FIG. 3 is created with K=2, W=2 and I=4, i.e., two applications, two services, and four hosts. In this example, two tenants request deployment of their application with respective latency $\Delta_k$ and the following service requirements: the tenant with Gold privileges requests that their application be run over the first host only, while the one with basic privileges requests that their application be run over the second and the fourth hosts. In some embodiments, a linear relationship is assumed between the amount of network load and its utilization of MEC processing resources $c_j$. FIG. 3 shows the results of allocating the applications to hosts, as per the decision made by the MEC slice broker. Therein, Gold-type requests are completely satisfied, that is, application $A_1$ run on host $H_1$, while Basic-type requests are mapped by the MEC slice broker aiming at minimizing the resource consumption. In the example, since the second application $A_2$ has loose delay requirements $\Delta_2$, it can be enabled on MEC host $H_4$ alone, avoiding wasting resources in host $H_2$ but still keeping the latency below the threshold $\Delta_2$. In this case, mobile users under the coverage area of host $H_2$ will access the service through host $H_4$. The MEC slicing problem can be formulated as:

$$\min_{x,y} \sum_{i \in \mathcal{J}} \left( \sum_{k \in \mathcal{K}} a_k x_{k,i} + \sum_{w \in \mathcal{W}} s_w y_{w,i} \right) \quad (1)$$

-continued $$\text{s.t.} \sum_{k \in \mathcal{K}} a_k x_{k,i} + \sum_{w \in \mathcal{W}} s_w y_{w,i} \leq c_i \forall i \in \mathcal{J} \quad (1a)$$

$$z_{k,j}(\lambda_j + \delta_{i,j}) \leq \Delta_k x_{k,i} + M(1 - t_{k,i,j}) \quad (1b)$$
$$\forall k \in \mathcal{K}, \forall i, j \in \mathcal{J}$$

$$z_{k,i} p_k - x_{k,i} \leq 0 \ \forall k \in \mathcal{K}, \forall i \in \mathcal{J} \quad (1c)$$

$$b_{k,w} x_{k,i} - y_{w,i} \leq 0 \quad (1d)$$
$$\forall k \in \mathcal{K}, \forall i \in \mathcal{J}, \forall w \in \mathcal{W}$$

$$\sum_{i \in \mathcal{J}} t_{i,j,k} \geq 1 \ \forall k \in \mathcal{K}, \forall i \in \mathcal{J} \quad (1e)$$

Given the input parameters, the output of the problem has to deliver an optimal placement strategy. The decision variable $x_{k,i} \in \{0,1\}$ denotes whether an incoming tenant requests for application $A_k$ is placed in host $H_i$. The decision variable $y_{w,i} \in \{0,1\}$ establishes whether the service w which may be required by application $A_k$ is enabled in host $H_i$. Finally, $t_{i,j,k} \in \{0,1\}$ models the choice to migrate the application $A_k$ from host $H_i$ to host $H_j$.

The objective function in Eq. 1 defines an optimal MEC application placement which allows the coexistence of heterogeneous tenants. The model of Eq. 1 when solved, minimizes the overall capacity consumption. The result can be translated into operational cost reduction policies or used to modify current admission and control settings, potentially increasing the number of tenants application running in the MEC system.

A complete MEC system can be described starting from a network of MEC hosts and the set of resources in the MEC hosts. Equation (1a) is a capacity constraint that relates application and service consumptions to MEC hosts' capability. Equation (1b) sets the maximum delay budget for each application and destination host. Tenant requests are represented by the variable $z_{k,j}$, which takes into account the willingness of the tenant to deploy the application $A_k$ on a specific MEC host $H_j$. However, such a tenant might not have the privileges to demand for a guaranteed deployment, and its application instance may be migrated by the MEC provider into a more convenient location. Exploiting the Big M Method and the artificial variable $t_{i,j,k} \in \{0,1\}$, together with constraint (1d), there will be at least one alternative at the requested location $z_{k,i}$ during the decision process. The value of M is chosen to be sufficiently large so that the artificial variable $t_{i,j,k}$ will not be part of any feasible solution. Since an incoming request in i can be virtually enabled, depending on latency requirements, on any other MEC host of the network, the indexes i and j run over the same hosts set $\mathcal{J}$. As introduced before, tenants belonging to different categories are provided with diverse privileges. This is taken into account by equation (1c) which ensures that Gold type requests ($p_k=1$) will be entirely satisfied, while this may not be the case for other categories. Finally, equation (1e) provides the mean for the concurrent deployment of specific services if required by an application that has been enabled on that host.

Figure 4:
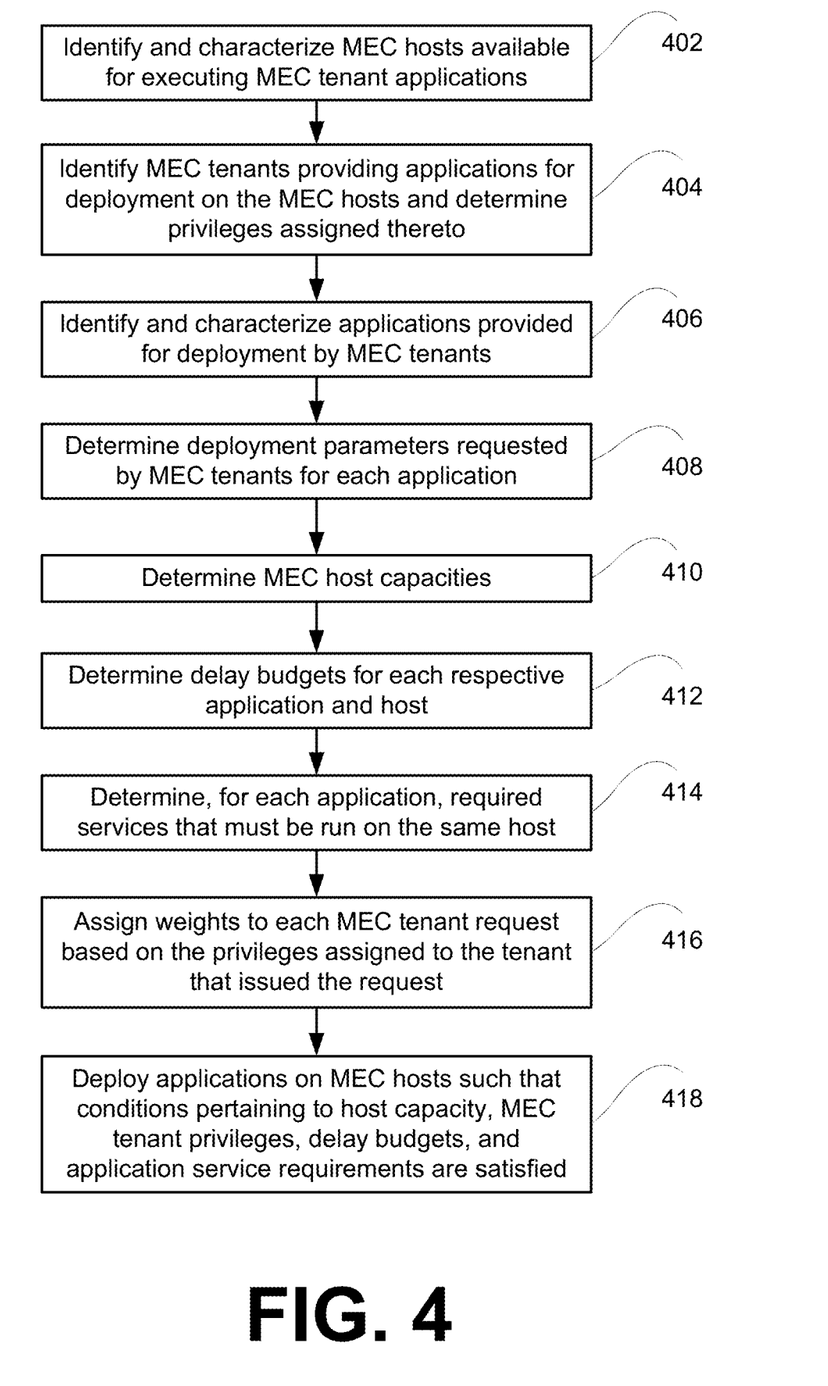
FIG. 4 is a flow diagram illustrating a process for for placing applications and services at hosts of an MEC system according to an embodiment of the invention.

FIG. 4 is a flow diagram illustrating a process performed by an MEC broker, e.g. the MEC broker 214, for placing applications and services at hosts of an MEC system based on the privileges assigned to MEC tenants. The process illustrated in FIG. 4 allows the MEC broker 214 to solve a placement problem by which the MEC provider can simultaneously satisfy a plurality of MEC tenant requests, honor guarantees provided to the MEC tenants in SLAs, and improve the overall efficiency of the MEC system. At 402, the MEC broker 214 identifies a set of hosts included in the MEC system that are available to execute MEC tenant applications and characterizes each host. Each host $H_i$ can be characterized, for example, by $H_i=\{c_i,\lambda_i, \delta_i\}$ where $c_i$ is the host's total available capacity, expressed as a single value which synthetizes the host's computing resources, $\lambda_i$ is a fixed term that takes into account average latency to the users due to MEC and radio access network (RAN) displacement, and $\delta_i:=\{\delta_{i,j}\}j\in \mathcal{I}$ where $\delta_{i,j}$ is the average transport latency between two hosts $H_i$ and $H_j$.

At 404, the MEC broker 214 identifies MEC tenants that have provided applications for deployment on the hosts of the MEC system and determines the privileges assigned to the identified MEC tenants. The privileges assigned to the MEC tenants can include, e.g., LCM privileges. LCM privileges assigned to tenants can, for example, provide MEC tenants with the ability to execute operations such as bootstrapping, termination, scaling, and migration. The privileges assigned to the MEC tenants can also include, e.g., the right to specify that an application will be deployed as a specific hosts and/or the right to specify that an application will be deployed on a host located in a specific geographic location. The privileges assigned to the MEC tenant can also be used to determine a priority level for each of the MEC tenants, such priority level determining the priority with which requests of individual MEC tenants will be satisfied relative to the requests of other MEC tenants. The privileges assigned to the MEC tenants can be used to determine a hierarchical priority ranking of each every MEC tenant or to assign each of the MEC tenants to one or more priority tiers. The privileges assigned to the MEC tenants can, e.g., be stored at a database local to the MEC broker 214 or external to the MEC broker 214.

At 406, the MEC broker 214 identifies a set of applications that the MEC tenants have provided for deployment on the hosts of the MEC system and characterizes each application. Each application $A_k$ can be characterized, for example, by $A_k=\{a_k,\Delta_k,b_{k,w}\}$, where $a_k$ represents the processing consumption, $\Delta_k$ is the highest tolerable latency, and $b_{k,w}$ is the set of services $\{S_w\}$ required by the application $A_k$ to run in the same host as the application itself. The characterization of each application, i.e. $A_k=\{a_k,\Delta_k,b_{k,w}\}$, can, for example, be stored at a database or set of databases and associated with the MEC tenant that requested its deployment and the privileges assigned to that MEC tenant.

At 408, the MEC broker 214 determines, for each respective application, a set of deployment parameters requested by the MEC tenant that provided the respective application and the privileges assigned to that MEC tenant. The set of service parameters requested by the MEC can include, e.g., a specific MEC host or a specific set of MEC hosts on which the respective application be deployed, a specific geographic region within which the host on which the application is deployed is located, and delay/latency requirements.

At 410, the MEC broker 214 determines a capacity of each respective MEC host to provide the capabilities required for the specific application and the privileges assigned to the MEC tenant that issued the request to deploy the specific application at the specific host. The MEC broker 214 represents, using the characterization of the hosts and the characterization of the applications, the condition that the processing resources and service usage required by all applications running on a specific host does not exceed the available capacity of the specific host.

At 412, the MEC broker 214 determines, for each respective application and each respective host, a maximum delay budget. The maximum delay budget can include, for example, a highest tolerable latency $\Delta_k$ of each application and latency requirements requested by the MEC tenant that requested deployment of the application. The MEC broker 214 represents, using the characterization of the hosts and the characterization of the applications, the condition that the maximum delay budget for each respective host and application is not be exceeded. The condition specifies, e.g., that delays associated with a respective application not exceed the highest tolerable latency $\Delta_k$ for the respective application.

At 414, the MEC broker determines, for each respective application, a set of services that must be run on the same host as the respective application and represents the condition that the set of services $b_{k,w}$ required by each respective application be assigned to the same host to which the respective application is assigned.

At 416, the MEC broker 214 assigns, to each MEC tenant request, a weight that is determined based on the privileges assigned to the MEC tenant that issued the request. For example, the MEC broker 214 assigns weights the requests from MEC tenants for deployment at a specific host or geographical location and the requests for maximum latency based on the privileges assigned to the MEC tenants and/or a priority ranking or priority tiers determined from the privileges assigned to the MEC tenants. The MEC broker 214 also represents the condition that certain guarantees provided to MEC tenants based on their assigned privilege levels are satisfied.

At 418, the MEC broker 214 deploys the applications and services on the hosts such that the conditions pertaining to host capacity, MEC tenant privileges, delay budgets for each application and host, and the application service requirements are satisfied.

Figure 5:
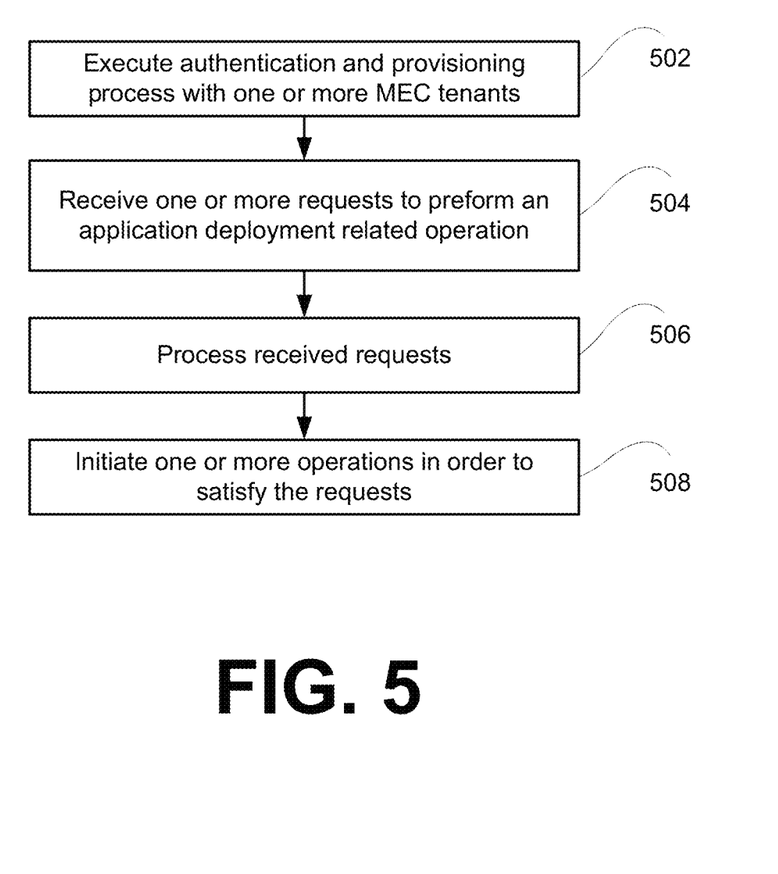
FIG. 5 is a flow diagram illustrating a method for processing application deployment and related requests from MEC tenants according to an embodiment of the invention.

FIG. 5 is a flow diagram illustrating a process performed by an MEC broker, i.e. the MEC broker 214, for processing application deployment and related requests from MEC tenants. At 502, the MEC broker 214 executes an authentication and provisioning process with one or more MEC tenants, e.g. the MEC tenant 216. During the authentication and provisioning process, the MEC broker 214 enables, for example, a login-based procedure through which the MEC tenants acquire privileges and priorities, request updates, and query the authentication status. The login-based procedure may include entering a username/password combination and/or using a public/private key pair or a certificate. Each acquired privilege can, for example, be tagged with a priority associated with the MEC tenant. The tag has a validity in time and indicates the priority of the operation vis a vis operations requested by other MEC tenants.

At 504, the MEC broker 214 receives one or more requests from the one or more MEC tenants to perform an application deployment related operation. For each received request, the MEC broker can determine, for example, an MEC host $H_i$ (if the request specifies a particular host on which the operation is to be carried out) and an application $A_k$ to which the request pertains and privileges assigned to the MEC tenant that issued the request. The MEC tenant also determines a set of parameters for the request. The set of parameters can include, for example, those necessary to characterize the application $A_k$, i.e. a processing consumption $a_k$; a highest tolerable end-to-end delay $\Delta_k$; and a set $b_{k,w}$ of services $\{S_w\}$ required by the application $A_k$ to run in the same host as the application itself. The MEC broker can record the requests from the one or more MEC tenants, e.g. at a database.

At 506, the MEC broker 214 processes the requests. Processing of the requests can include, for example, pre-validating the requests in order to detect the presence of conflicts. In the event conflicts are detected, the MEC broker 214 can determine application deployment related operations that resolve the detected conflicts. Conflicts can be detected, for example, by comparing the characterization of the application $A_k=\{a_k,\Delta_k,b_{k,w}\}$ with the characterization of the host $H_i=\{c_i,\lambda_i,\delta_i\}$ (if the request pertains to a particular host) and with conditions pertaining to host capacity, MEC tenant privileges, delay budgets, and application service requirements. If a conflict is detected, the MEC broker determines a manner of resolving the conflict which may include migrating an application from one MEC host to another. The MEC broker resolves the conflicts by considering the SLA requirements of the MEC tenants and priorities derived from the privileges assigned to the MEC tenants. For example, the MEC broker can resolve conflicts by representing the conditions discussed above in connection with FIG. 4 and performing a migration such that applications and services are deployed on the MEC hosts of the MEC system in a manner such that the conditions pertaining to host capacity, MEC tenant privileges, delay budgets for each application and host, and the application service requirements are satisfied.

At 508, the MEC broker initiates one or more operations, e.g., by interfacing the with MEC management entities, in order to satisfy the requests according to, e.g., the privileges assigned to the MEC tenant that issued the request. For example, the MEC broker 214 interacts with MEC management entities (the MEC orchestrator 208, the MEC platform manager 210 and the user app LCM proxy 220) to perform operations supported by such entities as per the MEC specifications GS MEC 010-1 and GS MEC 010-2. Said operations may include: (1) application package on-boarding as defined by ETSI specification; (2) application instance installation on selected MEC hosts 202; (3) application provisioning, through appropriate parameters configuration; and (4) application life-cycle management including cloud computing procedures such as bootstrapping, termination, migration, and scaling. Bootstrapping involves starting the virtual machine (VM)/software container that contains the application. Termination involves switching off such VM/software container. Scaling can refer to increasing the resources assigned to the VM/software container as well as to replicating an instance of the VM/software container.

Simulations were performed to evaluate some embodiments of the disclosure. In order to optimize the distribution of MEC resources within the network a detailed analysis of the infrastructure characteristics was considered. A real network topology was chosen for evaluation purposes. In particular, the GARR (Gruppo per l'Armonizzazione delle Reti della Ricerca—Group for the harmonization of research networks) network is composed of 37 hosts spread over the Italian territory and more than 80 edges connecting the hosts. Given the set of edges and nodes location, the delay matrix was obtained running Dijkstra's Algorithm. Without loss of generality, an MEC host's capacities were equally distributed and normalized to a unitary value. The computational requirement for each application and service was expressed with respect to a fixed value y which represents $\frac{1}{100}$ of the single host capacity, as recited in Table II. These values were small enough to fit into the MEC hosts, as it would after the execution of the admission and control processes. The relationship between services and applications was obtained randomly at runtime. Other useful system parameters are recited in Table I.

TABLE I

SIMULATION PARAMETERS FOR FIG. 4

| System Parameters | Values |
|---|---|
| $|J|$ | 37 |
| $|W|$ | 4 |
| M | 1000 |

TABLE II

TENANT CATEGORY

| | Tenant Category | | |
|---|---|---|---|
| | Basic | Premium | Gold |
| $\Delta_k$ [ms] | [100, 150] | [50, 100] | [20, 50] |
| $p_k$ | 0 | 0 | 1 |
| $a_k$ | $\gamma$ | $4 * \gamma$ | $5 * \gamma$ |
| $s_k$ | | $5\gamma$ | |

Figure 6:
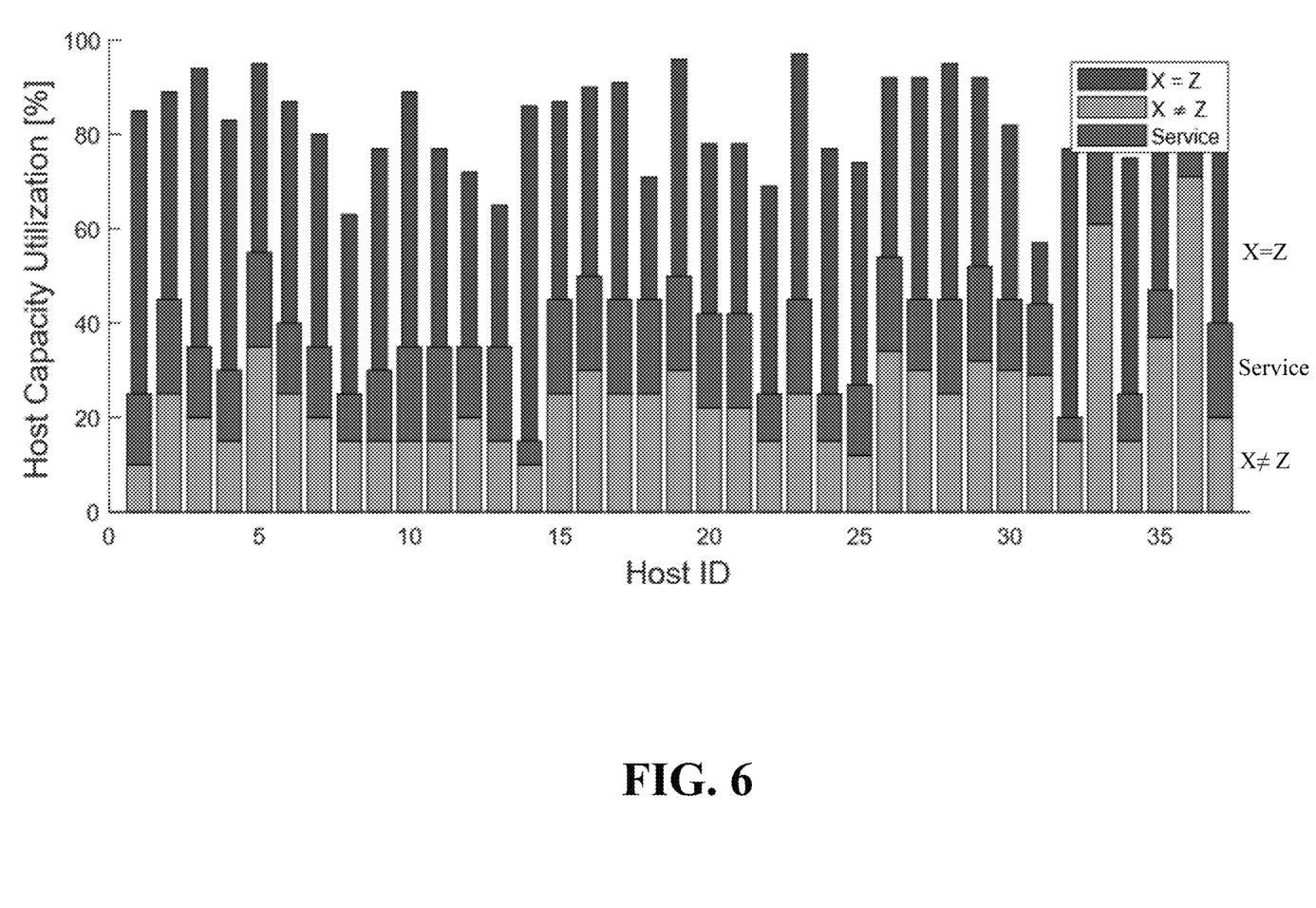
FIG. 6 shows results of application and service consumption according to an embodiment of the invention.

Given the lack of comparable MEC slicing solutions in literature, embodiments of the invention were evaluated against the baseline approach of placing application requests and relative services exactly where each tenant demands. FIG. 6 shows the host's utilization for a set of W=4 services and K=50 requests distributed among the available Basic, Premium, and Gold categories according to a 40%, 40%, 20% ratio. In the first scenario, tenants were allowed to place their applications exactly where they asked, no matter their delay requirements. This brought to an overall increase of resource utilization due to the unavoidable concurrent deployment of the same services and applications, even on nearby hosts. In the second scenario, this privilege was granted only to Gold tenants. Embodiments of the present invention allowed for a smarter deployment of resources, taking into account service consolidation, and led to generally 40% resource savings.

Figure 7:
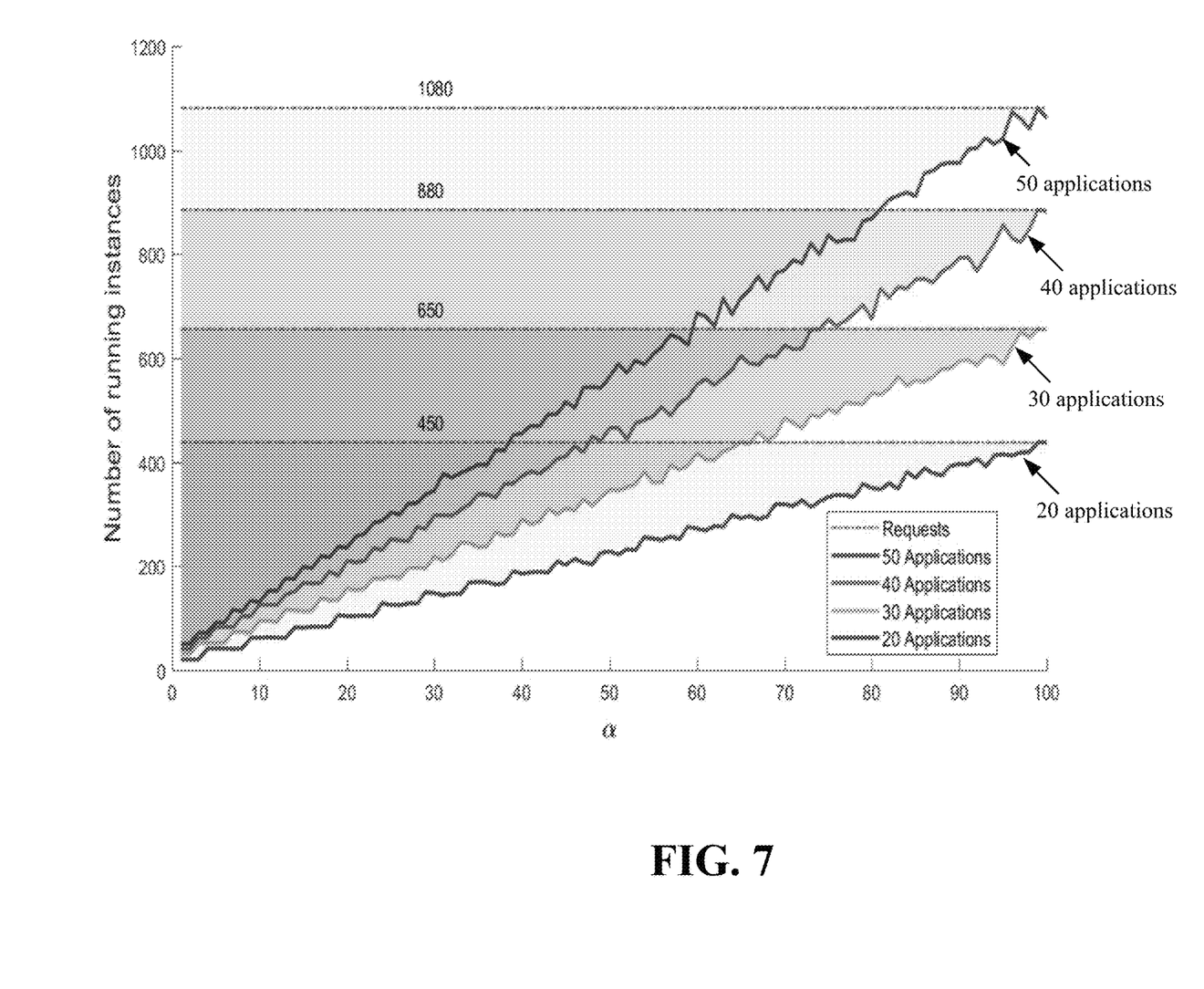
FIG. 7 is a graph showing management privileges' impact on consolidation capabilities according to an embodiment of the invention.

FIG. 7 shows the impact of an increasing number of highly demanding tenants on an MEC system's consolidation capabilities. The number of running application instances monolithically increased according to the value of α, as the percentage of users belonging to the Gold category. This behavior can be explained if considering that with more stringent delay requirements, the possibility of finding a suitable host close enough to satisfy the incoming request while offloading decreases. As consequence, the same application was deployed on multiple platforms without any consolidation opportunity. This provides motivation for having different tenant classes, since stringent delay requirements deeply impact general system capabilities.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a"

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for operating a multi-access edge computing (MEC) system in which tenant applications are provided by MEC tenants for deployment on MEC hosts of the MEC system, the method comprising:
receiving, from each of a plurality of MEC tenants, an application package, the application package including application software be installed at one or more of the MEC hosts of the MEC system, the application software corresponding to a tenant application of the tenant applications;
assigning, to each of the plurality of MEC tenants from which an application package is received, a set of at least one application management privilege;
receiving application operation requests issued by MEC tenants, wherein the application operation requests specify operations to be performed for the tenant applications at one or more of the MEC hosts;
pre-validating, using the sets of at least one application management privilege assigned to the plurality of MEC tenants, the application operation requests so as to detect conflicts on the MEC hosts; and
performing tenant application life-cycle management operations in response to the application operation requests,
wherein the tenant application life-cycle management operations include one or more of the group consisting of: bootstrapping, termination, migration, and scaling,
wherein bootstrapping involves starting a virtual machine (VM) or software container to run an instance of a tenant application,
wherein termination involves terminating a VM or software container running an instance of a tenant application,
wherein migration involves moving, from one MEC host to another MEC host, one or more VMs or software containers running an instance of a tenant application, and
wherein scaling involves increasing or decreasing a quantity of resources assigned to a VM or software container that contains an instance of a tenant application or replicating a VM or software container that contains an instance of a tenant application.

2. The method according to claim 1, further comprising resolving the detected conflicts according to priorities derived from the sets of at least one application management privilege assigned to the plurality of MEC tenants.

3. The method according to claim 1, further comprising generating an alarm in response to a conflict being detected, wherein the alarm prevents lower priority MEC tenants from executing commands associated with the detected conflict.

4. The method according to claim 1, wherein migration involves moving one or more VMs or software containers running an instance of a respective tenant application from an overloaded MEC host to a non-overloaded MEC host.

5. The method according to claim 4, wherein migration is performed based on a respective set of at least one application management privilege assigned to a respective MEC tenant that provided the respective tenant application.

6. The method according to claim 4, wherein migration is performed by an MEC broker to reduce a number of conflicts by resources on the MEC hosts.

7. The method according to claim 1, the method further comprising performing application provisioning, wherein the application provisioning includes assigning an MEC host to a first tenant application provided by a first MEC tenant of the plurality of MEC tenants such that the MEC host runs an instance of the first tenant application according to a set of service parameters.

8. The method according to claim 7, wherein an MEC broker performs the application provisioning so as to minimize MEC resource usage.

9. The method according to claim 7, wherein the set of service parameters includes a maximum delay budget for a provisioned application and a maximum delay budget for an MEC host at which the application is to be provisioned.

10. The method according to claim 1, wherein the plurality of MEC tenants are split into 3 categories:
a Basic category in which MEC tenants are granted a set of at least one application management privilege that includes the privilege to specify a first delay requirement but no management privileges;
a Premium category in which the MEC tenants are granted a set of at least one application management privilege that includes the privilege to specify a second delay requirement but no management privileges, wherein the second delay requirement is less than the first delay requirement; and
a Gold category in which the MEC tenants are granted a set of at least one application management privilege that includes the privilege to specify a third delay requirement and are also granted management privileges.

11. The method according to claim 1, further comprising recording commands issued by the plurality of MEC tenants to track privileges acquired by each MEC tenant.

12. The method according to claim 1, further comprising providing a list of available privileges to the plurality of MEC tenants, wherein each privilege in the list of privileges is associated with a corresponding tag, wherein a tag indicates a time validity of the privilege and a priority of a command issued by a respective MEC tenant compared to priorities of commands issued by other respective MEC tenants.

13. The method according to claim 1, wherein migration is performed by an MEC host to reduce a number of conflicts.

14. The method according to claim 13, wherein the conflicts are detected by an MEC broker.

15. The method of claim 1, further comprising:
initiating, by an MEC broker via interactions with one or more of an MEC Orchestrator, an MEC platform manager, and a user app lifecycle management (LCM) proxy, operations including one or more selected from the group consisting of:
application package on-boarding,
application instance installation on selected MEC hosts, and application provisioning, through configuration of appropriate parameters.

16. The method according to claim 1, wherein the assigning, to each of the plurality of MEC tenants from which a respective application package is received, a set of at least one application management privilege includes assigning, to each respective MEC tenant of at least a subset of the plurality of MEC tenants from which an application package is received, administrative privileges that allow the respective MEC tenant to perform administrative functions for a respective tenant application corresponding to the respective application package.

17. The method according to claim 16, wherein the administrative privileges allow the respective MEC tenant to directly operate the MEC system via one or more MEC interfaces of the MEC system.

18. The method according to claim 17, wherein the MEC interfaces of the MEC system via which the respective MEC tenant is allowed to directly operate the MEC system include one or more of:
  an Mm1 interface between an operations support system (OSS) of the MEC system and an MEC orchestrator of the MEC system;
  an Mm2 interface between the OSS of the MEC system and an MEC platform manager of the MEC system; and
  and Mm8 interface between the OSS of the MEC system and a user app lifecycle management (LCM) proxy.

19. An MEC system for deployment of tenant applications provided by MEC tenants, the MEC system comprising:
  a plurality of MEC hosts; and
  an MEC management server including one or more processors and memory, the one or more processors being configured to:
    receive, from each of a plurality of MEC tenants, an application package, the application package including application software be installed at one or more of the MEC hosts of the MEC system, the application software corresponding to a tenant application of the tenant applications,
    assign, to each of the plurality of MEC tenants from which an application package is received, a set of at least one application management privilege;
    receive application operation requests issued by the MEC tenants, wherein the application operation requests specify operations to be performed for the tenant applications at one or more of the MEC hosts;
    pre-validate, using the sets of at least one application management privilege assigned to the MEC tenants, the application operation requests so as to detect conflicts on the MEC hosts; and
    perform tenant application life-cycle management operations in response to the application operation requests,
  wherein the tenant application life-cycle management operations include one or more of the group consisting of: bootstrapping, termination, migration, and scaling,
  wherein bootstrapping involves starting a virtual machine (VM) or software container to run an instance of a tenant application,
  wherein termination involves terminating a VM or software container running an instance of a tenant application,
  wherein migration involves moving, from one MEC host to another MEC host, one or more VMs or software containers running an instance of a tenant application, and
  wherein scaling involves increasing or decreasing a quantity of resources assigned to a VM or software container that contains an instance of a tenant application or replicating a VM or software container that contains an instance of a tenant application.

20. The system of claim 19, wherein the one or more processors collectively provide an MEC Orchestrator, an MEC platform manager, a user app lifecycle management (LCM) proxy, and an MEC broker, wherein the MEC broker is configured to:
  application package on-boarding,
  application instance installation on selected MEC hosts, and
  application provisioning, through configuration of appropriate parameters.

* * * * *